US012496742B2

(12) United States Patent
Stümpel et al.

(10) Patent No.: US 12,496,742 B2
(45) Date of Patent: Dec. 16, 2025

(54) METHOD, MANUFACTURING CELL, AND WOOD VENEER

(71) Applicant: SEBASTIAN STÜMPEL & PHILIPP DAHLEM ROOTPECKER GBR,VERTRETEN DURCH DIE GESELLSCHAFTER HERRN SEBASTIAN STÜMPEL, 52070 AACHEN UND HERRN PHILIPP DAHLEM, 52062 AACHEN, Aachen (DE)

(72) Inventors: Sebastian Stümpel, Aachen (DE); Philipp Dahlem, Aachen (DE)

(73) Assignee: SEBASTIAN STÜMPEL & PHILIPP DAHLEM ROOTPECKER GBR, VERTRETEN DURCH DIE GESELLSCHAFTER HERRN, Aachen (DE)

( * ) Notice: Subject to any disclaimer, the term of this patent is extended or adjusted under 35 U.S.C. 154(b) by 274 days.

(21) Appl. No.: 18/268,877

(22) PCT Filed: Dec. 19, 2021

(86) PCT No.: PCT/EP2021/086683
§ 371 (c)(1),
(2) Date: Jun. 21, 2023

(87) PCT Pub. No.: WO2022/136203
PCT Pub. Date: Jun. 30, 2022

(65) Prior Publication Data

US 2024/0051177 A1 Feb. 15, 2024

(30) Foreign Application Priority Data

Dec. 21, 2020 (DE) ..................... 10 2020 134 525.9

(51) Int. Cl.
*B27D 1/08* (2006.01)
*B27D 1/10* (2006.01)

(52) U.S. Cl.
CPC ............... *B27D 1/083* (2013.01); *B27D 1/08* (2013.01); *B27D 1/10* (2013.01)

(58) Field of Classification Search
CPC . B27D 1/08; B27D 1/083; B27D 1/10; B27D 3/00
See application file for complete search history.

(56) References Cited

U.S. PATENT DOCUMENTS 2,308,453 A * 1/1943 Potchen ................. B27D 1/083 425/389
2,452,740 A * 11/1948 Fairchild .................. B27D 1/08 428/130

(Continued)

FOREIGN PATENT DOCUMENTS

CH 203500 A * 3/1939 ............. B27D 1/083
DE 1166997 B 4/1964

(Continued)

OTHER PUBLICATIONS

BENZ Tooling, 'WOOD—BENZ Schneidaggregat / Cutting Unit SECO', 2015, https://www.youtube.com/watch?v=ABdpxbi4CD4 (Year: 2015).*

(Continued)

*Primary Examiner* — Jared O Brown
(74) *Attorney, Agent, or Firm* — CANTOR COLBURN LLP

(57) ABSTRACT

A manufacturing cell for producing a three-dimensionally deformable wood veneer, includes a receiving surface for receiving a wood veneer to be processed, and a device for partly or completely separating the wood veneer in order to form veneer strands. The cell further includes a device for pressing the wood veneer to be processed and the veneer (Continued)

strands against the receiving surface. The device is designed to generate a pressure difference between a first side and a second side of the wood veneer to be processed and the veneer strands.

7 Claims, 7 Drawing Sheets

(56) References Cited

U.S. PATENT DOCUMENTS

| | | | | | |
|---|---|---|---|---|---|
| 2,593,863 | A * | 4/1952 | Elmendorf | B27D 1/00 144/1.1 |
| 3,347,136 | A * | 10/1967 | Kure | B27D 1/06 425/383 |
| 3,495,492 | A * | 2/1970 | Gerber | B26D 7/018 83/427 |
| 2004/0144448 | A1 * | 7/2004 | Moeller | B27D 1/08 144/344 |

FOREIGN PATENT DOCUMENTS

| | | | | | |
|---|---|---|---|---|---|
| DE | 3430201 | A1 | | 3/1985 | |
| DE | 271672 | A1 | | 9/1989 | |
| DE | DD-271670 | A1 | * | 9/1989 | B27D 1/08 |
| DE | 271670 | B5 | | 9/1994 | |
| DE | 10124913 | C1 | | 12/2002 | |
| DE | 102004036591 | A1 | | 2/2006 | |
| DE | 102004043290 | A1 | * | 3/2006 | B27D 1/00 |
| DE | 102009012744 | A1 | | 9/2010 | |
| DE | 102011002209 | A1 | | 10/2012 | |
| DE | 102013101428 | A1 | | 8/2014 | |
| GB | 485071 | A | | 5/1938 | |
| GB | 840640 | A | * | 7/1960 | B27D 1/08 |
| GB | 2146461 | A | * | 4/1985 | B26D 7/018 |
| WO | WO-9113755 | A1 | * | 9/1991 | |

OTHER PUBLICATIONS

BENZ Tooling, "WOOD—BENZ Schneidaggregat / Cutting Unit SECO", dated Jan. 15, 2015, https://www.youtube.com/watch?v=ABdpxbi4CD4.

International Search Report for International Application No. PCT/EP2021/086683, dated Apr. 29, 2023, 2 pages.

Written Opinion for International Application No. PCT/EP2021/086683, dated Apr. 29, 2023, 7 pages.

* cited by examiner

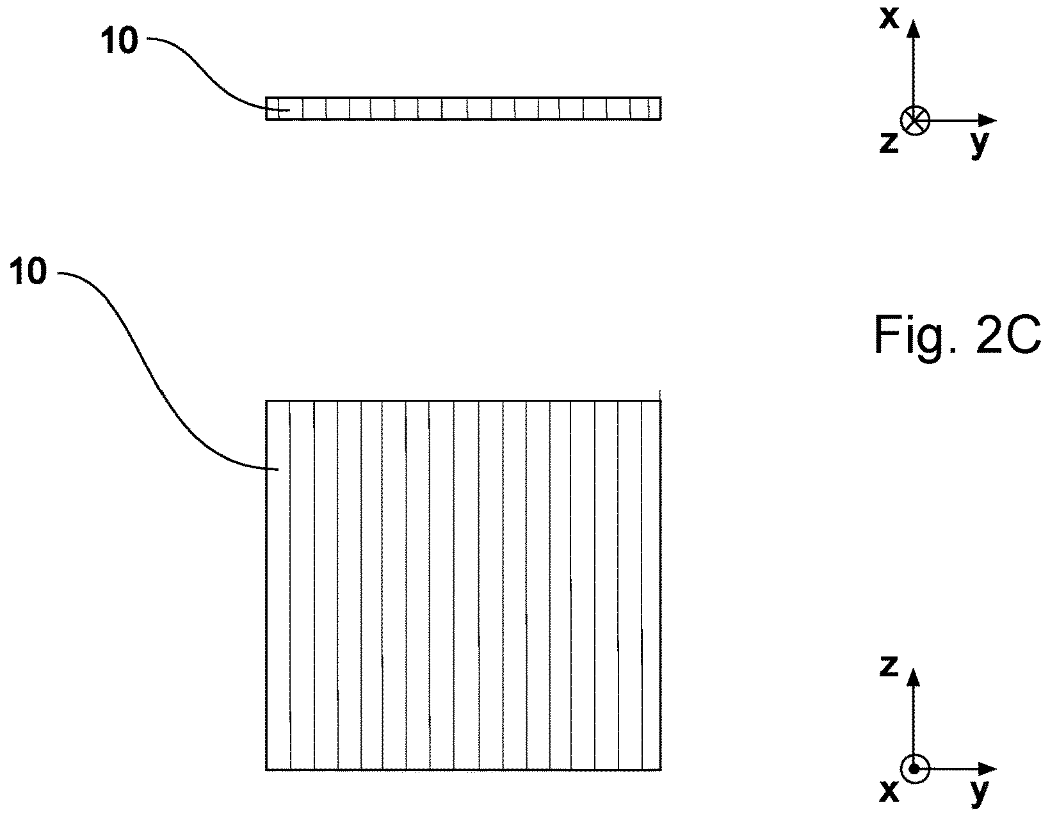
Fig. 2C
Fig. 2D
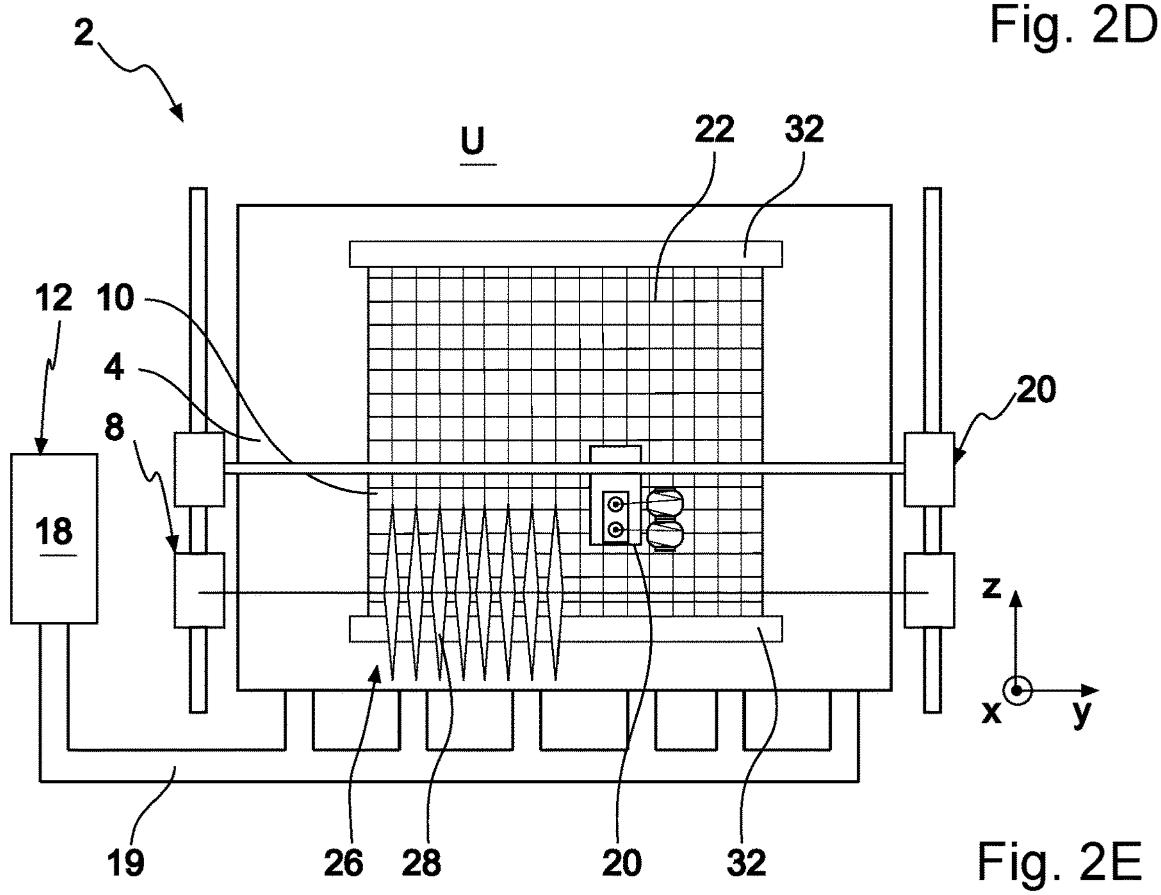
Fig. 2E

METHOD, MANUFACTURING CELL, AND WOOD VENEER

CROSS-REFERENCE TO RELATED APPLICATIONS

This application is a 35 U.S.C. § 371 National Stage patent application of PCT/EP2021/086683, filed on 19 Dec. 2021, which claims the benefit of German patent application 10 2020 134 525.9, filed on 21 Dec. 2020, the disclosures of which are incorporated herein by reference in their entirety.

TECHNICAL FIELD

The present disclosure relates to a method for producing a three-dimensional deformable wood veneer, comprising the process steps: Providing a wood veneer on a receiving surface, wherein the wood veneer lies with a first side against the receiving surface, partially or completely separating the wood veneer into a plurality of veneer strands; making connections between the veneer strands. The disclosure further relates to a manufacturing cell for manufacturing a three-dimensional deformable wood veneer and a three-dimensional deformable wood veneer.

BACKGROUND

DE 101 24 913 C1 describes a process for producing a three-dimensional deformable wood veneer. According to DE 101 24 913 C1, narrow grooves are introduced into a wood veneer and the areas or veneer strands separated from each other by the grooves are reconnected to each other by a shear-deformable cross-bond. During the insertion of the grooves and the application of the cross-bond, the veneer is held together by a layer of the veneer which has not been cut and which is finally removed again by sanding, cutting or the like after the shear-deformable cross-bond has been applied.

In accordance with the teaching of document DE 101 24 913 C1, a sheet material is therefore provided as a material for the process claimed there, the thickness of which is at least 5% greater than the thickness of the 3D sheet element to be produced, wherein narrow grooves spaced apart from one another are introduced into the workpiece, the groove depth in each case being greater than or equal to the thickness of the 3D sheet element and less than the thickness of the workpiece. Precisely this, at least 5% of the thickness, of the material is therefore not, or not completely, divided when the grooves are introduced and forms a bond between the areas separated from one another as a full-surface layer until the actual shear-deformable transverse bond of non-woven or adhesive has been applied.

According to DE 101 24 913 C1, the final thickness of the three-dimensional formable wood veneer is produced by the final removal of this excess of at least 5% of the thickness. The "excess 5% of the thickness" can be, for example, a cardboard or the like, which is glued on before processing and finally removed again by cutting and/or grinding after slicing and producing the shear-deformable cross-bond.

The process described in DE 101 24 913 C1 has the disadvantage that at least the excess 5% of the thickness of each veneer produced is generated as waste. Furthermore, the provision and removal of such an additional or carrier layer are time-consuming and cost-intensive due to the process steps required for this.

SUMMARY

Against this background, the present disclosure is based on the technical problem of specifying an improved process and an improved production cell for producing a three-dimensional deformable wood veneer which, in particular, enables more cost-effective, faster and more resource-efficient production of three-dimensional deformable wood veneers. Further, a three-dimensional deformable wood veneer is to be disclosed.

The above-described technical problem is solved in each case by a process according the appended claims.

According to a first aspect, the disclosure relates to a method for producing a three-dimensional deformable wood veneer, comprising the method steps: Providing a wood veneer on a receiving surface, wherein the wood veneer has a first side abutting the receiving surface; Partially or completely separating the wood veneer into a plurality of veneer strands; making connections between the veneer strands. The method is characterized in that the wood veneer and the veneer strands are pressed against the receiving surface by generating a pressure difference, wherein a first pressure is present at the first side of the wood veneer and the veneer strands, wherein a second pressure is present at a second side of the wood veneer and the veneer strands facing away from the first side, and wherein the first pressure is smaller than the second pressure. In other words, the wood veneer and the veneer strands are pressed against the receiving surface with a force acting in particular over an area and are held in position.

It may be provided that the veneer strands are extended along a first direction and that the making of joints between the veneer strands is performed along a second direction, the second direction being different from the first direction.

Alternatively or complementarily, connections between the veneer strands may be made along the first direction and/or inclined to the first and/or second direction.

The wood veneer and the veneer strands are held in position under pressure so that an additional support layer is not required. In this way, flatness can be achieved on the one hand and the production of three-dimensional deformable wood veneer can be made faster and more resource-efficient on the other hand.

In particular, the wood veneer and the veneer strands are pressed against the receiving surface during the partial or complete separation and during the production of the joints between the veneer strands by creating the pressure difference.

Tests have shown that both the wood veneer during partial or complete separation and the veneer strands can be reliably held in position by means of the pressure difference. In particular, tests have shown that even very narrow, completely separated veneer strands can be reliably held in position by means of the pressure difference, so that a shear-deformable cross-bond, which may have to be applied, can be applied without an additional backing layer on the reverse side to provide a three-dimensional deformable wood veneer.

Wood veneer and veneer strands refer to one and the same semi-finished product at different processing stages. Before partial or complete cutting, the semi-finished product to be processed is referred to as "wood veneer" in this text. During and after partial or complete separation, the semi-finished product is referred to as "veneer strands", regardless of whether the veneer strands are completely separated from each other or are still connected to each other in sections or locally.

The terms "wood ply" and "wood layer" and "wood sheet" are used synonymously in the present text. The terms "layer" and "ply" or "additional layer" and "additional ply" are used synonymously in this text.

When a wood veneer is referred to herein, it may be a flat or sheet-like material having one or more layers of wood. For example, it may be envisaged that the wood veneer comprises a single layer of wood of one species.

The wood veneer may have a layer or sheet of wood that has been separated by sawing and/or cutting processes and/or peeling processes from a log of a wood species or from a block of wood that has already been processed.

Alternatively, it may be provided that the wood veneer comprises at least one wood layer of a wood species and comprises at least one additional layer which is bonded to the wood layer in a planar manner.

The additional layer may have another wood layer of another or the same type of wood, or may have, for example, a fleece or a paperboard. The wood veneer may have two or more additional layers. In particular, the wood veneer may have up to ten additional layers or, in particular, may have up to five additional layers. The wood layer may be bonded to such additional layer. Where two or more additional layers are provided, the additional layers may be glued together, for example.

The wood veneer can therefore in particular be a monomaterial, i.e., have only one type of wood, or be a sandwich material, i.e., have two or more layers of one or more types of wood and/or other materials stacked flat on top of each other.

A thickness of the wood veneer measured perpendicular to the first side of the wood veneer or to the support surface has, in particular, an amount selected from a range between 0.3 mm and 20 mm, inclusive.

In particular, the wood veneer has a thickness selected from a range between 0.3 mm and 2 mm inclusive.

In particular, the wood veneer has a thickness selected from a range between 0.45 mm and 1.2 mm inclusive.

In particular, the wood veneer has a thickness selected from a range between 1 mm and 5 mm inclusive.

In particular, the wood veneer has a thickness selected from a range between 5 mm and 20 mm, inclusive.

The wood veneer can be, for example, a sheet-like material with a thickness of, for example, 1.2 mm.

The wood veneer can have a length of up to 100 cm.

The wood veneer may have a length selected from a range of 10 cm-100 cm. The wood veneer can have a length selected from a range of 100 cm-1000 cm.

The wood veneer can have a width of up to 100 cm.

The wood veneer may have a width selected from a range of 10 cm-100 cm.

The wood veneer can have a width selected from a range of 100 cm-1000 cm.

The wood veneer may have a rectangular shape. For example, the wood veneer may have a length of about 80 cm and a width of 60 cm.

The wood veneer may have a square shape. For example, the wood veneer may have a length of about 40 cm and a width of 40 cm.

The individual veneer strands can each have a width selected from a range of 0.5 mm-3 mm.

The individual veneer strands can each have a width selected from a range of 3 mm-50 mm.

It may be provided that the first pressure has an amount selected from a range between 0.1 mbar-800 mbar, inclusive. It may be provided that the first pressure has an amount selected from a range between 0.1 mbar-500 mbar, inclusive. It may be provided that the first pressure has an amount selected from a range between 0.1 mbar-200 mbar, inclusive. It may be provided that the first pressure is a negative pressure relative to ambient pressure.

Alternatively or additionally, it may be provided that the second pressure has an amount selected from a range between 1013.25 mbar-3000 mbar, inclusive. It may be provided that the second pressure has an amount selected from a range between 1013.25 mbar-1500 mbar, inclusive. It may be provided that the second pressure has an amount selected from a range between 1100 mbar-1500 mbar, inclusive. It may be provided that the second pressure is an overpressure relative to the ambient pressure. It may be provided that the second pressure is equal to the ambient pressure.

It can be provided that the pressure difference between the first and the second pressure is 200 mbar or more. It can be provided that the pressure difference between the first and the second pressure is 500 mbar or more. It may be provided that the pressure difference between the first and second pressures is 800 mbar or more. It can be provided that the pressure difference between the first and the second pressure is 1000 mbar or more.

It can be provided that the pressure difference between the first and the second pressure is 3000 mbar or less. It can be provided that the pressure difference between the first and the second pressure is 2000 mbar or less. It may be provided that the pressure difference between the first and second pressures is 1100 mbar or less.

In particular, the pressure difference can be generated as a static pressure difference and kept substantially constant when viewed over the time span of the manufacturing steps, so that the pressure difference fluctuates by less than 10% during the process steps, in particular fluctuates by less than 5%, further in particular fluctuates by less than 2.5%.

When it is said in the present context that the wood veneer is pressed against the receiving surface by generating a pressure difference, the first pressure and the second pressure are generated in a pressure medium that exerts the pressure on the wood veneer. The pressure medium is in particular a fluid, further in particular a gas or gas mixture, further in particular ambient air. Ambient air, as is known, consists of about 78 vol % nitrogen, about 21 vol % oxygen and 1 vol % other gases. It may be provided that such a pressure medium, in particular ambient air, acts in particular directly on the wood veneer and the veneer strands or is in contact with the wood veneer and the veneer strands.

Complete separation of the wood veneer into a plurality of veneer strands means that the separation takes place across the entire thickness so that the veneer strands are completely separated from each other. After complete separation and before the joints are made, the veneer strands may therefore be present as individually removable separate veneer strands, each of which is no longer joined to its neighboring veneer strands. Only when the joints are made are the completely separated veneer strands united to form the three-dimensional deformable wood veneer.

Partial separation of the wood veneer into a plurality of veneer strands means that the veneer strands remain connected to each other at least in sections after separation and before or during the making of the connections. In other words, the veneer strands are not completely separated from each other by the cutting process, but connections remain between the veneer strands. This can be achieved by not separating the veneer strands at least in sections over the full thickness of the wood veneer and/or by introducing interrupted separation points.

The receiving surface may be a substantially continuous planar surface against which the wood veneer lies flat and planar. Alternatively, the receiving surface may be grid-like and have a plurality of intersecting webs such that the wood veneer is merely supported in a grid-like manner and rests against the intersecting webs. Alternatively, the receiving surface may have a plurality of spaced segments. Alternatively or complementarily, the receiving surface may have a surface structure that promotes uniform distribution of a pressure, such as intersecting grooves. In this case, in particular, no porous or permeable material structure of the receiving surface is necessary. It may be provided that the first pressure is generated by means of a vacuum pump. In other words, the wood veneer may be "sucked" to the receiving surface by means of a vacuum pump to generate the pressure difference and press the wood veneer to the receiving surface.

It may be provided that the first pressure is a negative pressure generated compared to an atmospheric pressure of a working environment.

It may be provided that the receiving surface comprises a porous material. In particular, the receiving surface can be formed on a plate that has a porous material or is made of a porous material.

The vacuum pump may be connected to the porous material so that, in operation, the vacuum pump generates the first pressure as a negative pressure also within the pores of the porous material and this negative pressure is thus applied to the first side of the wood veneer via the porous material.

When the term porous material is used, it refers in particular to an air-permeable material, such as an open-pored foamed material, an air-permeable wood-based material, such as MDF or particleboard, a fabric, a sintered material or the like.

Alternatively or additionally, the receiving surface may comprise or be made of a non-air-permeable material, such as a metal or the like. The non-air-permeable material can have a surface structure, holes, channels or the like, in the area of which a pressure acting on the wood veneer or the veneer strands can be generated.

For example, it may be provided that the receiving surface has through-holes that have been made in the material of the receiving surface, for example, by mechanical processing methods such as drilling or milling. Preferably, however, it is provided that the receiving surface is a planar surface made of a porous material, which enables the wood veneer and the veneer strands to be laid flat over their entire surface by generating a vacuum by means of a vacuum pump.

The following process step can be carried out: Laying the wood veneer and/or the veneer strands flat on the receiving surface, wherein the receiving surface is in particular a flat surface and in particular comprises a porous material and the first pressure is applied to the wood veneer and/or the veneer strands in particular via pores of the porous material.

It may be provided that the second pressure is the atmospheric pressure (1 bar) of the working environment. Insofar as the first pressure is generated, for example, by means of a vacuum pump, i.e., for example, is a reduced vacuum compared to the atmospheric pressure, the second pressure as the atmospheric pressure of the working environment can be applied to the second side of the wood veneer and the veneer strands and press the wood veneer and the veneer strands against the receiving surface in this way.

Alternatively or additionally, it can be provided that the second pressure is generated by means of a pump so that, for example, an increased pressure compared to an ambient pressure of a working atmosphere, i.e. an overpressure, can be generated in the region of the second side in order to press the wood veneer against the receiving surface. It may therefore be provided that the second pressure is an overpressure and the first pressure corresponds to the ambient pressure of a working atmosphere. It may therefore be provided that the second pressure is a positive pressure and the first pressure is a negative pressure. The terms "overpressure" and "suppression" refer to an ambient pressure of the working atmosphere, which is about 1 bar.

Preferably, however, the generation of a pressure difference takes place exclusively by means of a vacuum pump, so that the first pressure is lower than an atmospheric pressure of a working environment, while the second pressure applied to the second side is the atmospheric pressure of the working environment. It may be provided that the wood veneer and/or the veneer strands are pressed against the receiving surface by means of at least one hold-down device. Such a hold-down device may be, for example, a clamping bar or the like. It may be provided that such a hold-down serves for pre-positioning the wood veneer before the pressure difference is generated. Alternatively, it can be provided that the wood veneer and/or the veneer strands are pressed against the receiving surface at least temporarily by the hold-down device and due to the generated pressure difference during the execution of the process steps.

It may be provided that a hold-down device clamps the wood veneer before and/or during partial or complete cutting and, in particular, counteracts cutting or separating forces during partial or complete cutting so that the wood veneer is subjected to tensile loads during partial or complete cutting.

It may be provided that two or more hold-downs are used to press the wood veneer and/or the veneer strands against the receiving surface. In particular, it may be provided that six hold-downs or less, especially four hold-downs or less, are used to press the wood veneer and/or the veneer strands against the receiving surface. In particular, it may be provided that exactly two hold-downs are used to press the wood veneer and/or the veneer strands into the receiving surface.

It may be provided that two hold-down devices are used to apply a tensile stress to the wood veneer and/or the veneer strands along the first direction. In this way, the wood veneer and/or the veneer strands can be held in tension during cutting and/or during the production of the joints. This supports in particular a flatness and/or a positional stability of the wood veneer and/or the veneer strands during the cutting and/or during the manufacturing of the joints.

It can be provided that the partial or complete separation of the wood veneer is done by cutting. It may be provided that the partial or complete separation of the wood veneer is performed by means of one knife or by means of several knives. The wood veneer may therefore be divided into the veneer strands by cutting by means of a knife or by means of a plurality of knives. The veneer strands are therefore separated from each other by cuts, whereby the cuts may partially or completely penetrate the thickness of the wood veneer.

It can be provided that at least one knife is a roller knife. Alternatively or additionally, it can be provided that at least one knife is a perforating roller knife. Alternatively or additionally, it can be provided that at least one knife is a scoring knife. A respective rolling knife is in particular rotatably held or mounted on an axis or is rotatably drivable about an axis of rotation by means of a drive. A scoring knife is in particular fixedly connected to a holder, so that its degrees of freedom of movement are given only by the machine axes, such as CNC-controlled linear and/or swivel axes or the like.

Depending on whether the veneer strands are to be partially or completely separated from each other, the optimum knife for the processing task can therefore be selected.

For example, it can be provided that for the complete separation of the wood veneer into a plurality of substantially parallel arranged veneer strands, a rolling knife with a circular uninterrupted blade is used, which completely separates a veneer strand, for example, with a single cut, from the remaining wood veneer to be cut.

As far as, e.g., a partial separation by interrupted cuts is to be produced, perforation rolling knives can be used which have a segmented blade so that the respective blade, depending on the angular position, does not separate the wood veneer or only a part of its thickness.

A scoring knife can be used for both partial and complete severing. A rolling knife with a circular, uninterrupted blade can also be used for partial separation of the wood veneer, provided that a cutting depth of the rolling knife is set, for example, in such a way that the entire thickness of the wood veneer is not cut. In this way, the rolling knife introduces a separation point in the manner of a groove between adjacent veneer strands.

In particular, it is provided that the cuts separating the veneer strands partially or completely from each other are oriented parallel to each other. It can be provided that the cuts, viewed in a longitudinal direction, are segmented so that they are interrupted cuts and cross struts remain between the veneer strands, which continue to connect the veneer strands locally after separation.

It can be provided that two or more knives are arranged next to each other in order to simultaneously make parallel cuts in the wood veneer and thus simultaneously produce several veneer strands adjacent to each other.

It may be provided that two or more knives are arranged side by side, the arrangement of the knives covering the entire width of the wood veneer. Thus, it can be provided that all veneer strands are cut simultaneously with a single overrun of the knives.

It may be provided that two or more knives are arranged side by side, the arrangement of the knives covering part of the width of the wood veneer. Thus, it may be provided that the veneer strands are sequentially cut in two or more overflows of the knives. The number of overruns is determined by the ratio of the width of the wood veneer to the width of the knife arrangement. If, for example, the width of the knife arrangement corresponds to one third of the width of the wood veneer, three overruns are required to produce the veneer strands.

The width of the veneer strands for such a knife arrangement results in particular from the distance between the adjacent knives. However, half cutting widths can also be produced, for example, by carrying out a second overfeed after a first overfeed, with the knives being offset by half a knife spacing for the second overfeed. A respective veneer strand that has been produced in the first overfeed is therefore divided in the second overfeed into two veneer strands in each case, these two veneer strands from the second overfeed having half the width of the veneer strand from the first overfeed. It is understood that in this way, it is also possible to set thirds or quarters of the cutting width, etc., as the width for the veneer strands.

For example, it can be provided that two or more knives, in particular up to one hundred rolling knives, further in particular up to twenty rolling knives, and further in particular up to ten rolling knives are arranged next to each other on a shaft.

It can be provided that leading and/or trailing hold-downs are assigned to the knives, which additionally press and fix the wood veneer against the support surface during cutting.

According to alternative embodiments of the process, the partial or complete separation of the wood veneer may be performed by milling, laser cutting, water jet cutting, plasma cutting, embossing, punching, slotting, splitting or the like.

It may be provided that the joints between the veneer strands are made by applying an adhesive, in particular by applying a plurality of adhesive strands. For example, a plurality of parallel adhesive strands may be applied. Alternatively or additionally, the adhesive can be applied selectively as adhesive dots spaced apart from one another.

It may be provided that the first direction along which the veneer strands have been longitudinally stretched and separated and the second direction along which the adhesive strands run include an angle greater than 0° and less than or equal to 90° to each other. It may be provided that the first direction along which the veneer strands have been longitudinally stretched and separated and the second direction along which the adhesive strands run are parallel to each other and the adhesive is applied as adhesive strands at least partially in a parting line between the veneer strands and/or is applied to the parting line of adjacent veneer strands.

In particular, it may be provided that a longitudinal extension of the adhesive strands runs along the second direction and the second direction is oriented in particular orthogonally to the first direction along which the veneer strands are longitudinally extended and have been separated.

It may further be provided that the adhesive strands at least partially cross each other.

It may be provided that the adhesive is a hot melt adhesive, wherein a plurality of parallel strands of adhesive may be applied simultaneously as hot melt adhesive filaments by means of a filament applicator to create a plurality of joints between adjacent veneer strands in an overflow.

It may be envisaged that the adhesive is provided as a filament impregnated in hot melt adhesive. The thread may be a natural or synthetic fiber. The thread may be a textile thread. The thread may comprise a synthetic material. Thus, when an adhesive is referred to herein, it may be a thread coated with adhesive or a thread impregnated with adhesive.

It may be envisaged that the adhesive is a liquid adhesive, which is applied over an area or in strands or threads.

It may be provided that the adhesive is provided as an adhesive tape or tape or thread material so that individual tapes or threads can be adhered to join the veneer strands together. It may be provided that the tape or thread material is provided on a roll or spool and unwound from the roll or spool. Making the joints may also be referred to as applying a shear deformable cross-bond. In particular, the transverse composite or joints are thus produced in such a way that the produced joints are shear deformable and that the individual veneer strands can move longitudinally relative to each other, as viewed, to provide improved three-dimensional deformability.

The adhesive can be applied while partial or complete separation is taking place. The adhesive may be applied after the partial or complete severing is complete. An application device for applying adhesive can be arranged together with a cutting or separating device for partial or complete separation of the wood veneer on a common gantry of a production cell and can be moved together with the cutting or separating device. The application device can be arranged on a gantry of a manufacturing cell that is separate from the cutting or separating device.

In particular, a shear-deformable transverse bond can be produced by bonding the veneer strands by means of an applied adhesive, the adhesive being applied transversely to the veneer strands, for example, in a meandering manner.

The adhesive may be, for example, a glue, a hot melt adhesive, a multi-component adhesive or a rubber adhesive. The wood veneer and the three-dimensional deformable wood veneer made therefrom have the same layer structure and thickness, whereby any adhesive applied is not added to the layer structure and material thickness.

According to a further embodiment of the method, it may be provided that the wood veneer comprises at least one wood layer and at least one textile layer. In this case, it may be provided that the establishment of connections between the veneer strands, in particular in the second direction, is effected by the fact that the textile layer is not cut, or is not cut at least in sections, during the partial or complete separation of the wood veneer. Thus, the creation of joints between the veneer strands and the partial separation of the veneer strands take place simultaneously, with the textile layer forming a cross-bond as part of the wood veneer in particular. In this case, the textile layer forms a shear-deformable cross-bond.

When a textile layer or textile ply is referred to here, it consists in particular of a sheet-like textile material, such as a woven fabric, a knitted fabric, a braided fabric, a stitch-bonded fabric, a nonwoven fabric, a felt or the like. The textile layer may consist of a natural or synthetic fiber.

In particular, the textile layer can be a nonwoven layer.

In particular, the nonwoven layer may comprise a unidirectional nonwoven, wherein the unidirectional nonwoven may have an anisotropic fiber direction.

It may be envisaged that, in addition to the textile layer, a wood layer of the wood veneer has also been only partially separated, so that the veneer strands, in addition to the textile layer, also have joints that were part of the original wood layer of the wood veneer before separation. These joints resulting from the wood layer are not shear deformable, unlike the shear deformable cross-laminate of the textile layer, and break or tear during further processing or shaping of the three-dimensional deformable wood veneer, while the shear deformable cross-laminate of the textile layer remains intact.

For example, partial separation of the wood veneer comprising the wood ply and the textile ply can be achieved by means of a perforating roller cutter that produces perforated or segmented cuts.

A three-dimensional deformable wood veneer can therefore be produced whose shear-deformable cross-bond consists of a textile layer and no additional adhesive is applied to produce the shear-deformable cross-bond. Alternatively, a three-dimensional deformable wood veneer can be produced whose shear-deformable cross-bond comprises both a textile layer and an adhesive, in particular, an adhesive applied in the manner described above.

According to a second aspect, the disclosure relates to a manufacturing cell for producing a three-dimensional deformable wood veneer, comprising a receiving surface for receiving a wood veneer to be processed, comprising a device for partially or completely separating the wood veneer into a plurality of veneer strands. The manufacturing cell is characterized by a device for pressing the wood veneer to be processed and the veneer strands against the receiving surface; the device is arranged to generate a pressure difference between a first side and a second side of the wood veneer to be processed and the veneer strands.

The manufacturing cell is set up to carry out the process according to the disclosure described above. All structural features described with reference to the process according to the disclosure can be part of the device according to the disclosure, individual features being described in more detail below.

The receiving surface may be a substantially continuous planar surface. Alternatively, the receiving surface may be grid-like and have a plurality of intersecting webs such that the wood veneer is merely supported in a grid-like manner and rests against the intersecting webs. Alternatively, the receiving surface may have a plurality of spaced segments.

It may be provided that the receiving surface comprises a porous material. In particular, the receiving surface can be formed on a plate that has a porous material or is made of a porous material.

Alternatively or additionally, it can be provided that the receiving surface has through openings and/or surface structures, such as grooves, intersecting grooves or the like, which have been introduced into the material of the receiving surface, for example, by mechanical machining processes such as drilling or milling.

The device for pressing the wood veneer to be processed against the receiving surface may have a vacuum pump. The vacuum pump may be, for example, an electric vacuum pump.

Preferably, it is provided that the receiving surface is a planar surface made of a porous material, wherein the vacuum pump is coupled to the porous material. In this way, a full-surface planar contact of the wood veneer and the veneer strands can be made possible by generating a vacuum by means of the vacuum pump.

In particular, the vacuum pump can be connected to the porous material in such a way that, in operation, the vacuum pump generates a first pressure as a vacuum within the pores of the porous material and this vacuum is thus applied via the porous material to a first side of the wood veneer to be processed.

It can be provided that at least one knife is a roller knife. Alternatively or additionally, it can be provided that at least one knife is a perforating roller knife. Alternatively or additionally, it can be provided that at least one knife is a scoring knife.

It can be provided that two or more knives are arranged at intervals next to each other in order to simultaneously make parallel cuts in the wood veneer and thus simultaneously produce several mutually adjacent veneer strands. It can be provided that two or more knives are arranged at equidistant distances next to each other in order to simultaneously make parallel cuts in the wood veneer and thus simultaneously produce several veneer strands adjacent to each other.

It may be provided that two or more knives are arranged side by side, the arrangement of the knives covering a width of 0.01 m or more and of 10 m or less. It may be provided that two or more knives are arranged side by side, the arrangement of the knives covering a width of 0.001 m or more and of 1 m or less.

It may be provided that two or more knives are arranged side by side, the arrangement of the knives covering a width of 0.02 m or more and of 1 m or less. It may be provided that two or more knives are arranged side by side, the arrangement of the knives covering a width of 0.03 m or more and of 5 m or less. For example, it may be provided that two or more knives, in particular up to 500 rolling knives, and further in particular up to 20 rolling knives are arranged side by side on a shaft.

It may be provided that a distance between two adjacent knives is 0.2 mm or more and 50 mm or less. It may be provided that a distance between two adjacent knives is 0.3 mm or more and 20 mm or less. It may be provided that a distance between two adjacent knives is 0.5 mm or more and 10 mm or less. It may be provided that a distance between two adjacent knives is 0.5 mm or more and 5 mm or less. It may be provided that a distance between two adjacent knives is 0.5 mm or more and 2 mm or less, in particular 1 mm.

It can be provided that leading and/or trailing hold-downs are assigned to the knives, which additionally press and fix the wood veneer against the support surface during cutting. It can be provided that the leading and/or trailing hold-downs consist of a spring plate or, in particular, of a rolling roller.

The device for partial or complete cutting of the wood veneer can be continuously adjustable in two or more coordinate directions and/or have a stop for limiting the depth of cutting. The device for partial or complete cutting of the wood veneer can be continuously adjustable in, for example, exactly three coordinate directions and/or have a stop for limiting the depth of cutting. The device for partial or complete cutting of the wood veneer can be associated with traveling hold-down devices for fixing the veneer strands during cutting and/or gluing. The hold-down devices of the device for partial or complete cutting of the wood veneer can be rollers, rolls or skids.

The wood veneer may be supported on a movable table that is movable relative to knives, for example, so that the wood veneer may be moved by linear movement of the table toward rotating or stationary knives, for example, with a cutting feed caused by the movement of the table. The manufacturing cell may include CNC-controlled machine kinematics having up to three translational and up to three rotational controlled degrees of freedom of movement.

The production cell can have an application device for applying adhesive to join the veneer strands, wherein the application device for applying adhesive can have a heating device, wherein the heating device can be set up in particular for infinitely variable adjustment of the adhesive temperature. The application device can be assigned traveling hold-down devices for fixing the veneer strands during bonding. The hold-down devices of the application device can be rollers, rolls or skids. The hold-down devices of the application device can simultaneously be the hold-down devices of the device for partial or complete separation. Alternatively, the hold-downs of the application device and the hold-downs of the device for partial or complete separation can be provided separately from each other.

The application device for applying adhesive can have a thread applicator with one or more heating nozzles, via which a thread or several threads with hotmelt adhesive are glued to the veneer strands to produce a cross-bond, in particular, to produce a shear-deformable cross-bond.

The application device for applying the adhesive can be a thread applicator and have a heating device in which heating nozzles can be spring-mounted. The heating device can be set up to heat up the heating nozzles and to continuously adjust the adhesive temperature.

Each of the heating nozzles can be resiliently pressed against the veneer strands during the application of the adhesive, whereby the resilient mounting of the heating nozzles can be effected by means of respectively assigned springs.

According to alternative embodiments, more than two heating nozzles can be held on the heating device. In particular, up to 50 heating nozzles can be held on the heating device, in particular, up to 20 heating nozzles can be held on the heating device, further in particular 8 heating nozzles can be held on the heating device.

The cross-bond can be created with a thread coated with hot melt adhesive.

In particular, the filament is pulled through the heating nozzles, melting the hot melt adhesive and bonding it to the veneer strands.

The manufacturing cell may have one, two or more hold-downs for clamping the wood veneer against the receiving surface. The manufacturing cell may have one, two or more hold-downs for applying tension to the wood veneer. The tensile stress may alternatively or additionally be introduced as a process force as a result of a cutting or slicing process.

According to a third aspect, the disclosure relates to a three-dimensional deformable wood veneer, wherein the wood veneer comprises interconnected veneer strands, wherein the wood veneer comprises at least one wood ply and at least one textile ply, wherein the veneer strands are interconnected by the textile ply, and wherein the textile ply is not split or at least partially not split. The three-dimensional deformable wood veneer may have been produced by a method according to the disclosure. According to a fourth aspect, the disclosure relates to a three-dimensional deformable wood veneer produced by a process according to the disclosure. In particular, the three-dimensional deformable wood veneer does not have machining marks resulting from the removal of a support layer.

BRIEF DESCRIPTION OF THE DRAWINGS

The disclosure is described in more detail below with reference to a drawing illustrating examples of embodiments. It shows schematically in each case:

FIG. 2C veneer strands;

FIG. 2D veneer strands;

FIG. 2E a third process step of a method according to the disclosure;

DETAILED DESCRIPTION OF THE DRAWINGS

Figure 1A:
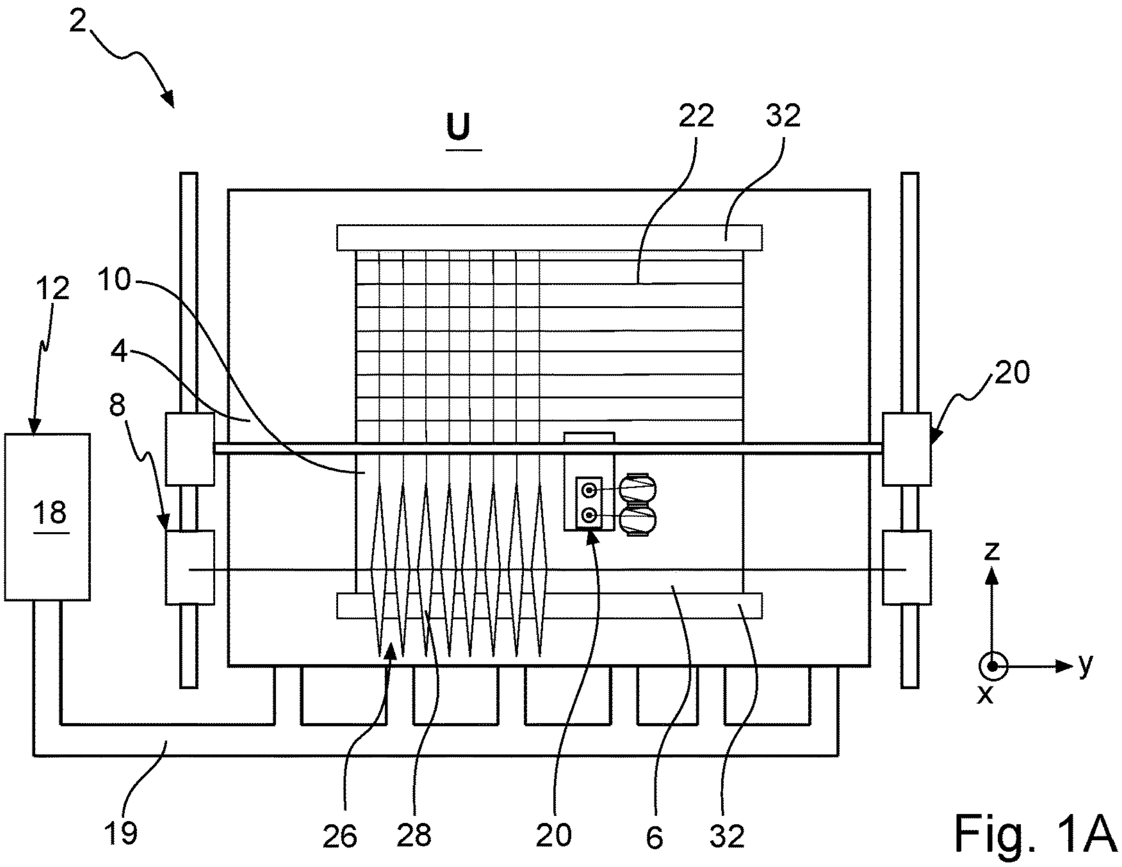
FIG. 1A a top view of a manufacturing cell according to the disclosure.

FIG. 1A shows a manufacturing cell 2 for producing a three-dimensional deformable wood veneer, with a receiving surface 4 for receiving a wood veneer 6 to be processed. The receiving surface 4 is a plane surface oriented parallel to a plane x-y of the Cartesian coordinate system x-y-z, according to FIG. 1A. The receiving surface has a porous material.

The manufacturing cell 2 has a device 8 for partially or completely separating the wood veneer 6 into a plurality of parallel veneer strands 10. The veneer strands 10 are extended parallel to a z-axis of the Cartesian coordinate system x-y-z according to FIG. 1A.

Figure 1B:
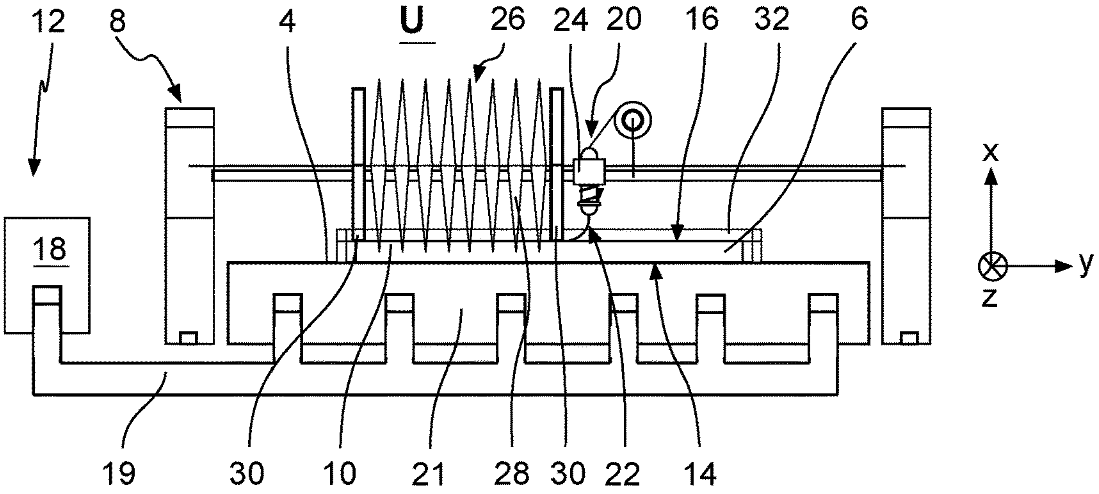
FIG. 1B a side view of the manufacturing cell according to the disclosure.

The manufacturing cell 2 has a device 12 for pressing the wood veneer 6 to be processed and the veneer strands 10 against the receiving surface 4, wherein the device 12 is arranged to generate a pressure difference between a first side 14 and a second side 16 of the wood veneer 6 to be processed and the veneer strands 10 (FIG. 1B).

The device 12 has a vacuum pump 18 which is connected to a plate 21 via hose connections 19, the receiving surface 4 is formed on the plate 21 and wherein the plate 21 is made of the porous material at least in the area of the receiving surface 4. The plate 21 may be sealed on a side facing away from the receiving surface.

The vacuum pump 18 is arranged to generate a negative pressure as a first pressure in the region of the side 14, the negative pressure being lower than an atmospheric pressure of a working environment U present at the second side 16 (FIG. 1B).

Furthermore, an application device 20 for applying adhesive 22 for joining the veneer strands 10 is provided. The adhesive 22 is an adhesive thread 22. The application device 20 for applying the adhesive 22 is a thread applicator 20 and has a heating device 24 in which heating nozzles 25 are resiliently mounted, and wherein the heating device 24 is set up for heating the heating nozzles 25 and for continuously adjusting the adhesive temperature (FIG. 6B).

Each of the heating nozzles 25 is pressed resiliently against the veneer strands during the application of the adhesive, the resilient mounting of the heating nozzles 25 being effected by means of respective associated springs 27.

The device 8 for partially or completely cutting the wood veneer 6 has a cutting device 26 with a plurality of rolling knives 28, which, viewed in the y-direction, are arranged at equidistant distances from one another.

The cutting device 26 is continuously adjustable in each coordinate direction x, y and z.

The application device 20 is continuously adjustable in each coordinate direction x, y and z.

According to alternative embodiments, the cutting device 26 and the application device 20 may be held on a common tool holder.

Stops 30 may be provided to limit the depth of the cut.

Manufacturing cell 2 has two hold-down devices 32 to fix the wood veneer 6. For better clarity, the hold-down device 32 is shown transparently in FIG. 1B. According to alternative embodiments, a single hold-down 32 can be provided.

Figure 7A:
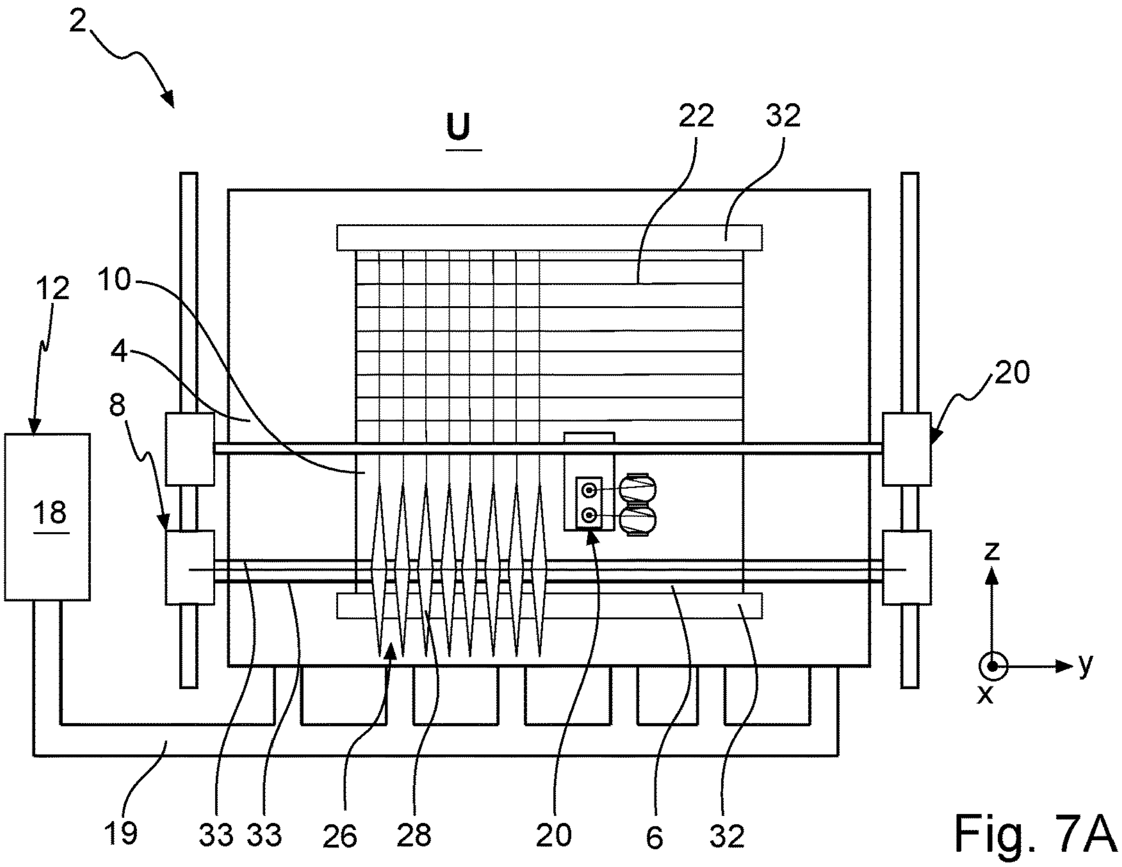
FIG. 7A a further manufacturing cell according to the disclosure in a top view.
Figure 7B:
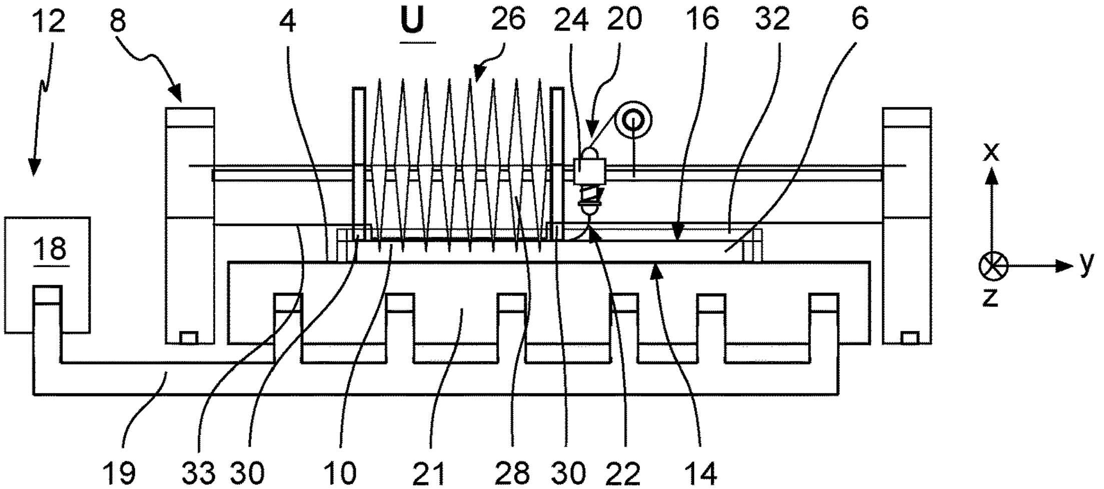
FIG. 7B a side view of the manufacturing cell according to the disclosure from FIG. 7A.

In addition, the device 20 may have additional hold-downs 33 that press the veneer 6 against the receiving surface 4, as shown in the example according to FIGS. 7A and 7B. FIGS. 7A and 7B show a further embodiment of a device 20 having additional hold-downs 33. The hold-downs 33 are traveling hold-downs 33, one hold-down 33 being arranged to lead the rolling knives 28 and one hold-down 33 being arranged to lag the rolling knives 28. The hold-down devices 33 ensure that the veneer strands are not lifted off the receiving surface 4 by the rolling knives 28. The hold-down devices 33 are resiliently clamped elastically against the wood veneer or the veneer strands.

In a first process step, the wood veneer 6 is provided on the receiving surface 4, with a first side 14 of the wood veneer 6 resting against the receiving surface 4.

The wood veneer 6 is pressed against the receiving surface 4 by generating a pressure difference by means of the vacuum pump 18. This also causes the wood veneer 6 to lie flat against the receiving surface 4, so that the wood veneer 6 lies against the receiving surface 4 over its entire surface and essentially without any gaps.

A vacuum is generated by means of the vacuum pump 18 in the region of the first side 14 as a first pressure, which is lower than an atmospheric pressure of the working environment U in the region of the second side 16. The first pressure is generated as a static pressure and is kept substantially constant throughout the subsequent processing.

Further, the wood veneer 6 is fixed with the hold-downs 32, whereby additional hold-downs 33 can be provided for fixing. Subsequently, in a second process step, the wood veneer 6 is completely separated into a plurality of veneer strands 10, the veneer strands 10 being extended along a first direction, in this case, parallel to the z-axis.

Figure 2A:
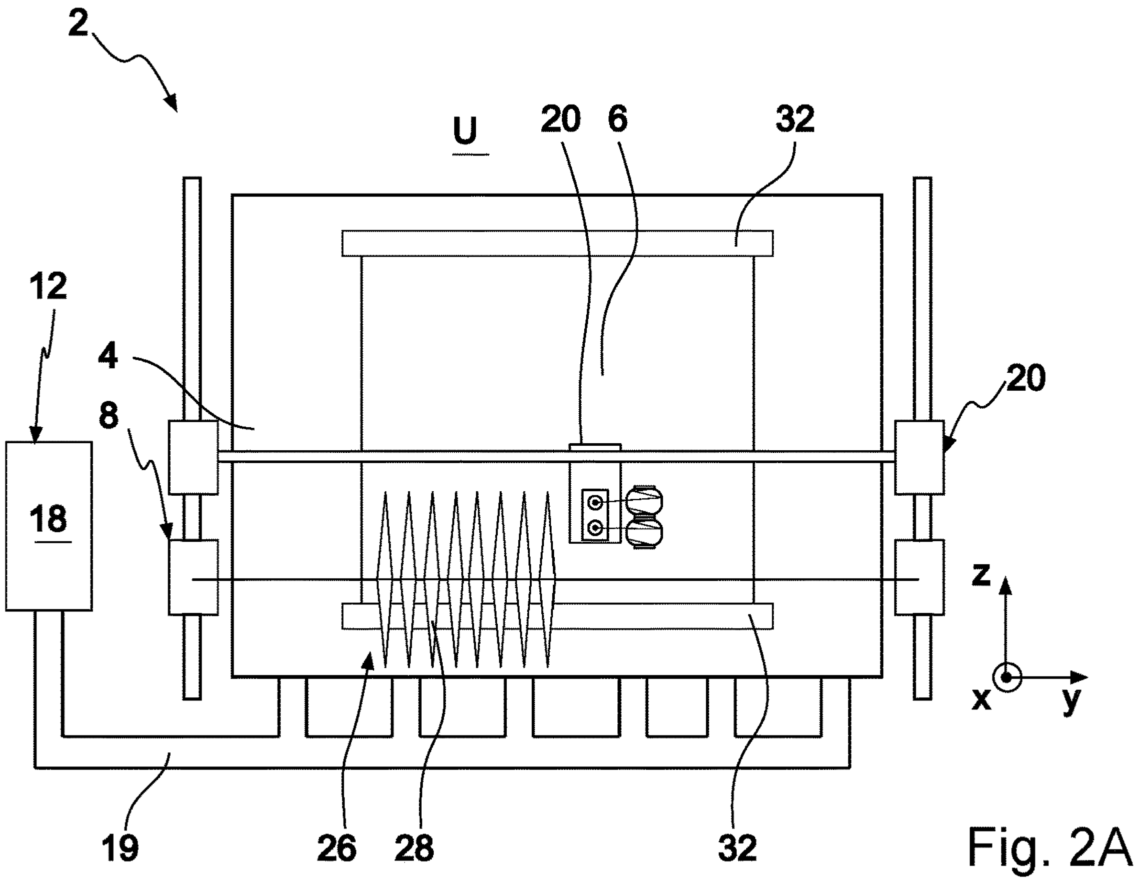
FIG. 2A a first process step of a method according to the disclosure.
Figure 2B:
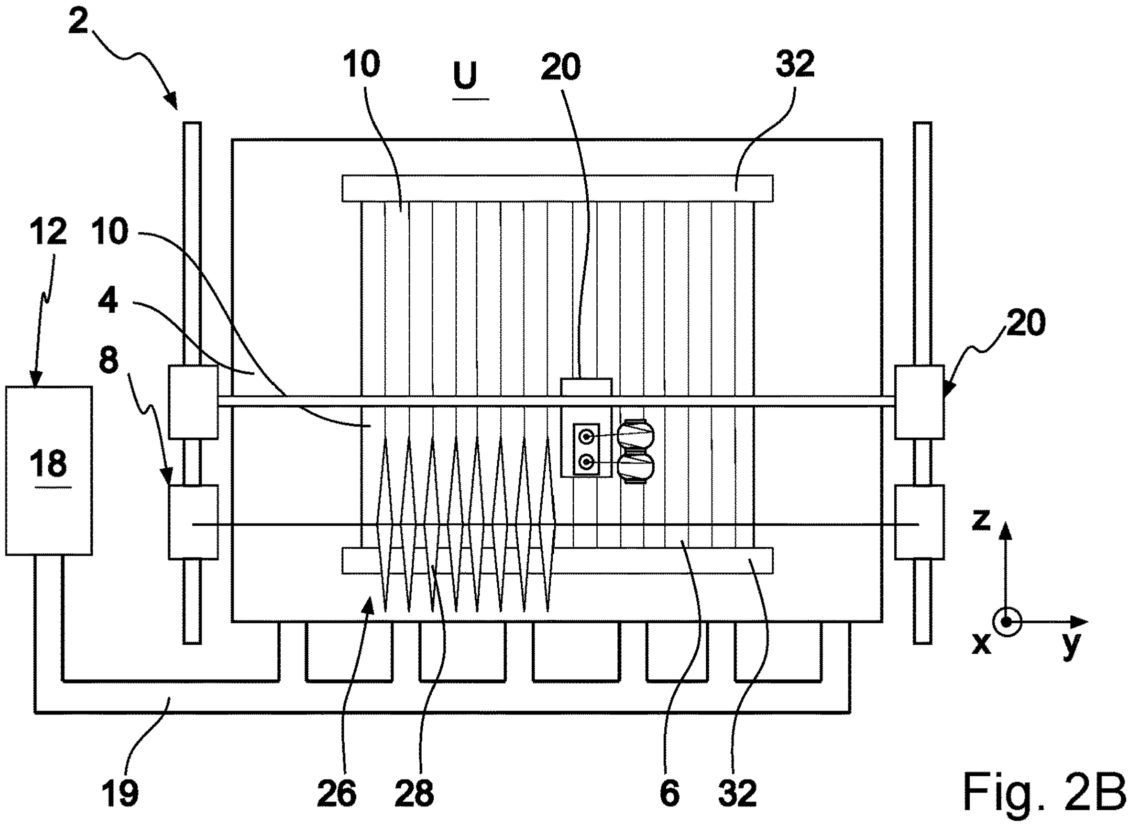
FIG. 2B a second process step of a method according to the disclosure.

As can be seen from FIGS. 2C and 2D, the veneer strands 10 have been completely separated from each other, but according to FIG. 2B they are still held in position by the pressure difference.

In a third process step, connections 22 are made between the veneer strands 10 along a second direction, the second direction being different from the first direction and being oriented parallel to the y-axis. Thus, the first and second directions are oriented perpendicular to each other.

The joints 22 are adhesive threads 22. The adhesive threads 22 or adhesive strands 22 form a shear deformable transverse bond.

Figure 2F:
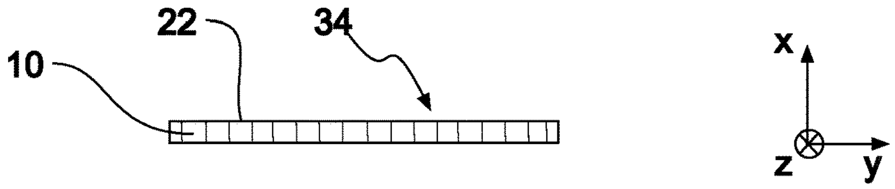
FIG. 2F a three-dimensional deformable wood veneer.
Figure 2G:
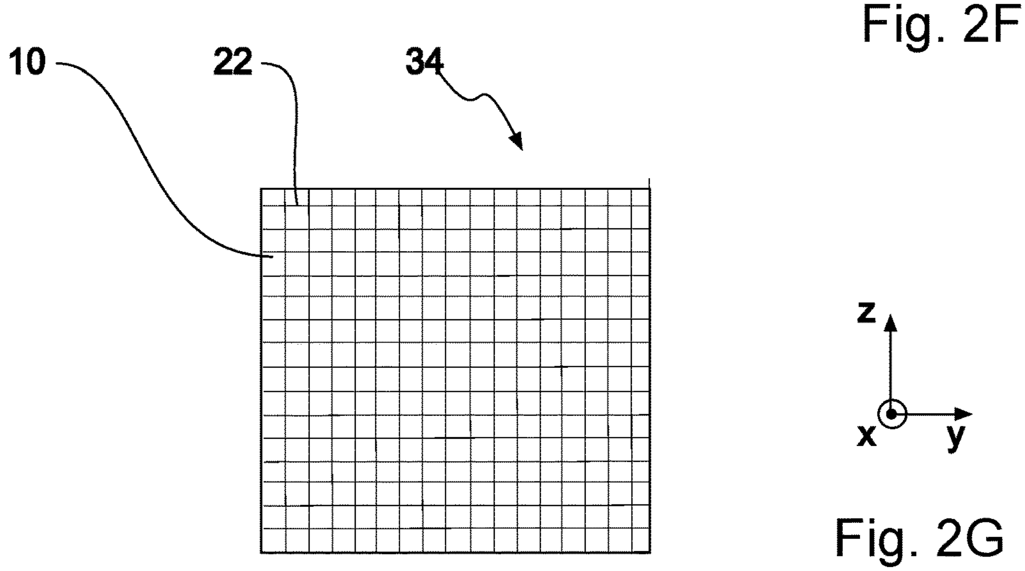
FIG. 2G a three-dimensional deformable wood veneer.

FIGS. 2F and 2G show a finished three-dimensional deformable wood veneer 34 comprising the veneer strands 10 and the shear deformable cross-bond formed from the adhesive threads 22.

Figure 3A:
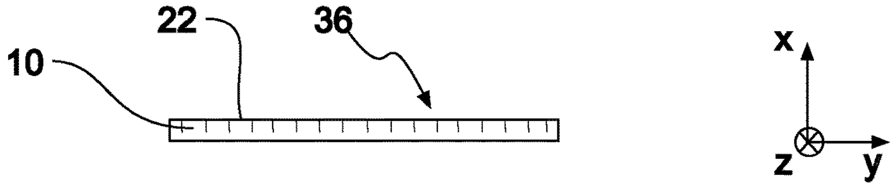
FIG. 3A a three-dimensional deformable wood veneer.
Figure 3B:
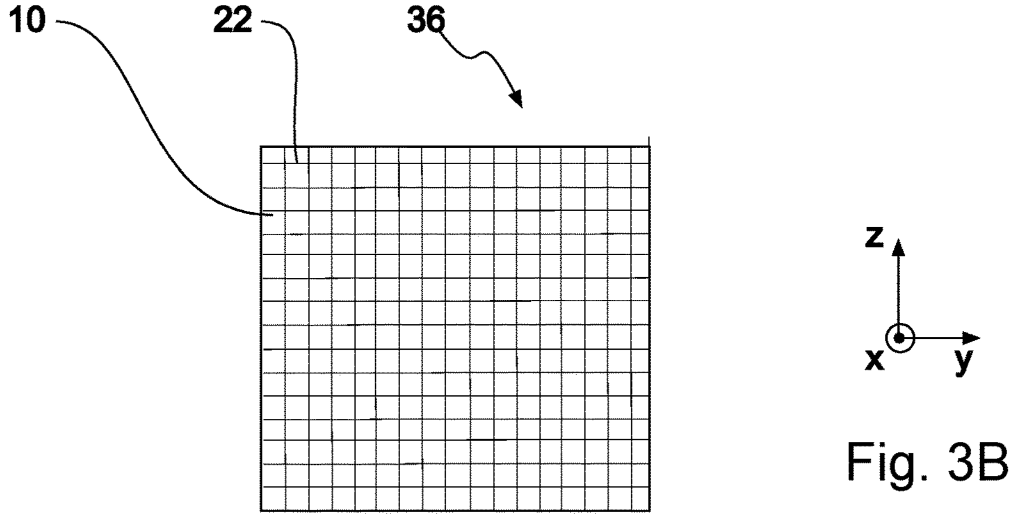
FIG. 3B a three-dimensional deformable wood veneer.

FIGS. 3A and 3B show a finished three-dimensional deformable wood veneer 36 consisting of the veneer strands 10 and the shear-deformable cross-laminate formed from the adhesive threads 22. The wood veneer 36 differs from the wood veneer 34 in that the veneer strands 10 have not been completely separated in the x-direction, i.e., in the thickness direction, but only partially.

Figure 4A:
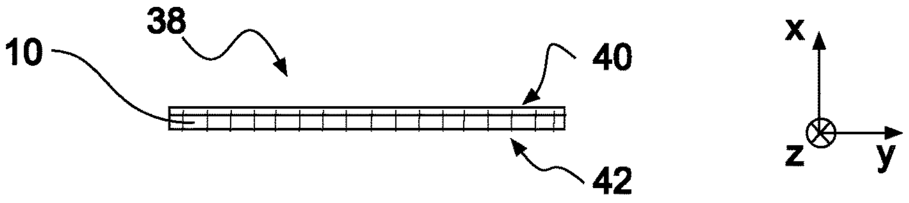
FIG. 4A a three-dimensional deformable wood veneer.
Figure 4B:
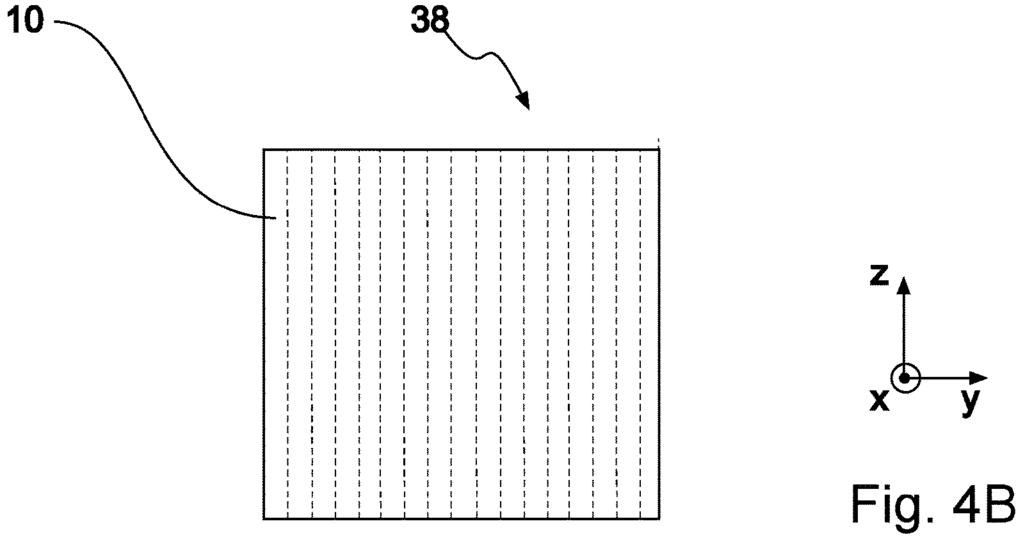
FIG. 4B a three-dimensional deformable wood veneer.
Figure 5A:
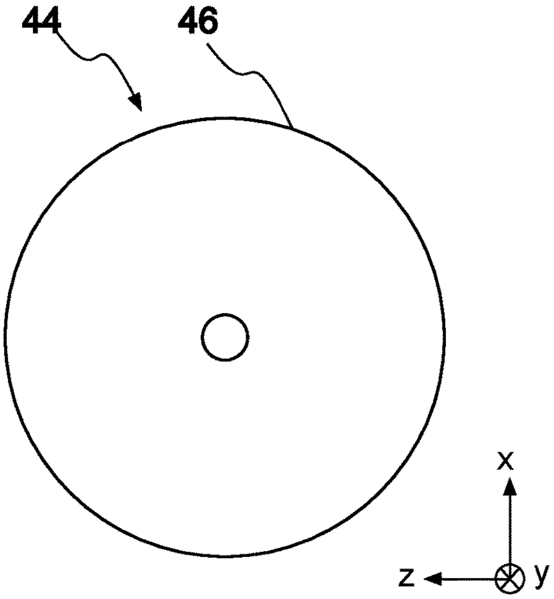
FIG. 5A a rolling knife.

FIGS. 4A and 4B show a finished three-dimensional deformable wood veneer 38 comprising the veneer strands 10. The veneer strands 10 have a nonwoven layer 40 and a wood layer 42 that has been partially separated by perforating knives with interrupted cuts. There are no adhesive threads, but the nonwoven ply 40 forms the shear-deformable cross-bond here. When the three-dimensional deformable wood veneer 38 is deformed, the existing cross-connections of the wood ply 42 break, while the shear-deformable cross-connection of the nonwoven ply remains intact. FIG. 5A shows a roller blade 44, with a circular, uninterrupted cutting edge 46.

Figure 5B:
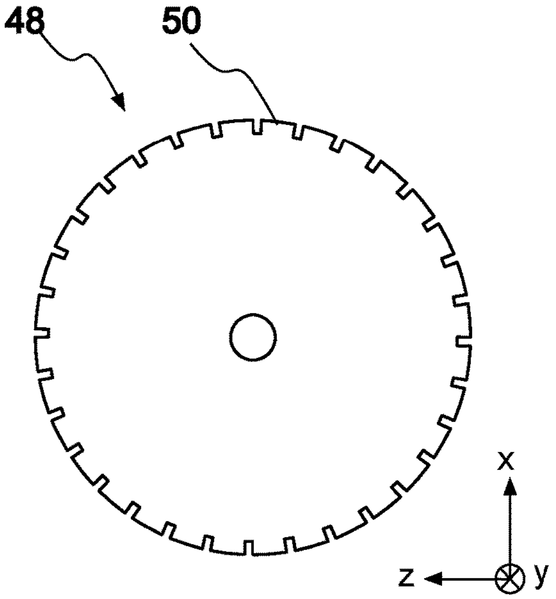
FIG. 5B a perforating rolling knife.

FIG. 5B shows a perforating roller blade 48, with a segmented cutting edge 50.

Figure 6A:
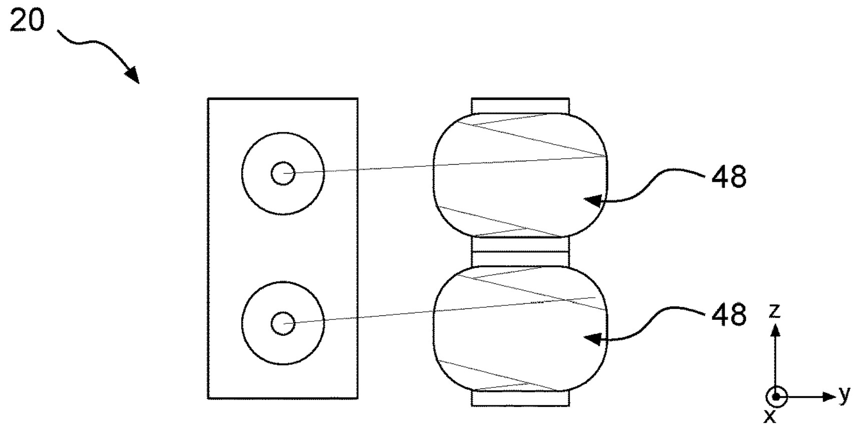
FIG. 6A a thread applicator in a top view.
Figure 6B:
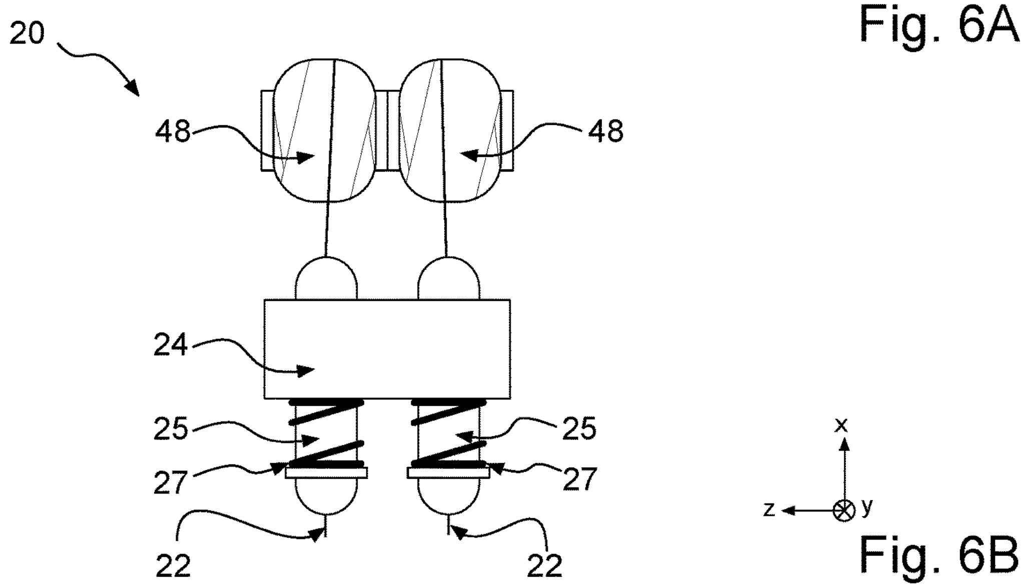
FIG. 6B a side view of the thread applicator from FIG. 6A.
Figure 6C:
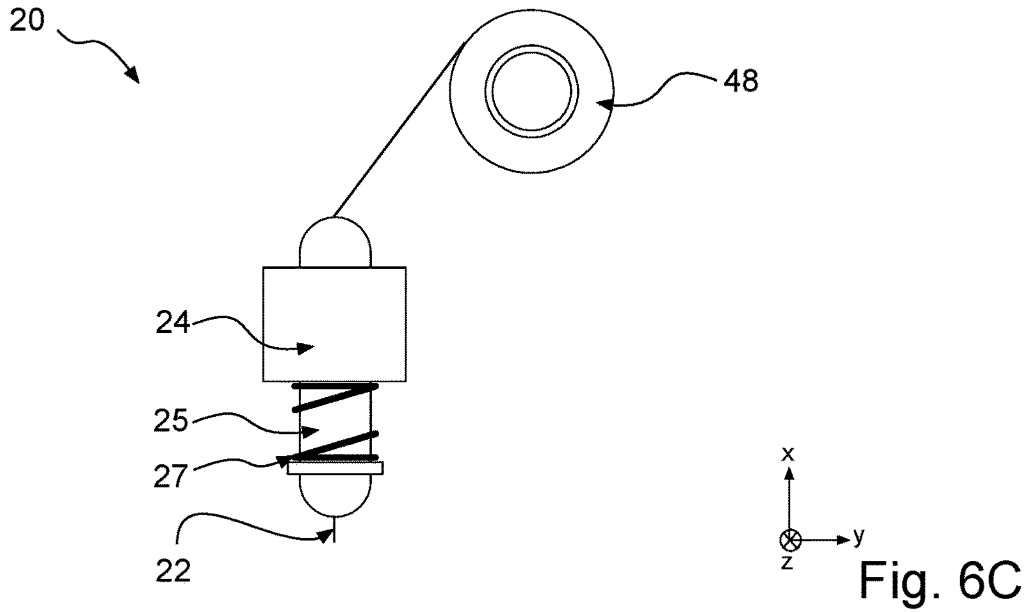
FIG. 6C the thread applicator of FIG. 6A in a further side view

FIGS. 6A, 6B and 6C show the thread applicator 20 in three views. The filament applicator 20 has two heating nozzles 25, so the filament applicator 20 can apply two adhesive filaments simultaneously.

The thread applicator 20 has the heating device 24, in which the heating nozzles 25 are spring-mounted. The heating device 24 is set up to heat the heating nozzles 25 and to continuously adjust the adhesive temperature.

Each of the heating nozzles 25 is pressed resiliently against the veneer strands during the application of the adhesive, the resilient mounting of the heating nozzles 25 being effected by means of respective associated springs 27.

Each heating nozzle 25 is associated with a filament spool 48 from which the respective adhesive-coated filament 22 is unwound.

The invention claimed is:

1. A method for producing a three-dimensional deformable wood veneer, the method including the following steps:

providing a wood veneer flatly held on a plane receiving surface, the wood veneer having a first side abutting the receiving surface, the wood veneer has a thickness selected from a range between 0.3 mm and 2 mm inclusive;

partially or completely separating the flatly held wood veneer into a plurality of flatly held veneer strands, wherein the partial or complete separation of the wood veneer is performed using a plurality of knives, wherein two or more knives are arranged next to each other to simultaneously make parallel cuts in the wood veneer and simultaneously produce the plurality of veneer strands which are adjacent to each other and wherein the cuts separating the veneer strands partially or completely from each other are oriented parallel to each other and wherein the veneer strands each have a width selected from a range of 0.5 mm-3 mm;

producing joints between the flatly held veneer strands; wherein during the partial or complete separation and during producing the joints, the wood veneer and the veneer strands are pressed against the receiving surface by creating a pressure difference, so that the wood veneer and the veneer strands are flatly held during the partial or complete separation and during producing the joints, wherein a first pressure is present on the first side of the wood veneer and veneer strands, wherein a second pressure is present on a second side of the wood veneer and veneer strands facing away from the first side, and wherein the first pressure is smaller than the second pressure.

2. The method, according to claim 1, wherein the veneer strands are extend along a first direction and the step of producing the joints between the veneer strands is performed along a second direction, the second direction being different than the first direction.

3. The method, according to claim 1, wherein the first pressure is generated by a vacuum pump and/or that the second pressure is an atmospheric pressure of a working environment, and/or that the second pressure is generated by a pump.

4. The method, according to claim 1, wherein the wood veneer and/or the veneer strands are pressed against the receiving surface by at least one hold-down device.

5. The method, according to claim 1, wherein at least one knife of the plurality of knives is a rolling knife, a perforating rolling knife or a scoring knife.

6. The method, according to claim 1, wherein the step of producing the joints between the veneer strands is carried out by applying a plurality of adhesive strands, wherein the adhesive strands are applied while the step of separating is carried out.

7. The method according to claim 1, wherein the wood veneer has at least one wood ply and at least one textile ply, and the step of producing the joints between the veneer strands does not include cutting the textile ply during the the step of separating of the wood veneer or does not include cutting the textile ply at least in sections.

* * * * *